United States Patent [19]

Reichert

[11] Patent Number: 4,956,160

[45] Date of Patent: Sep. 11, 1990

[54] PROCESS FOR REMOVAL OF HYDROGEN SULPHIDE USING SPECIFIC IRON OXIDES

[75] Inventor: Günther Reichert, Cologne, Fed. Rep. of Germany

[73] Assignee: Bayer Aktiengesellschaft, Leverkusen, Fed. Rep. of Germany

[21] Appl. No.: 384,622

[22] Filed: Jul. 25, 1989

[30] Foreign Application Priority Data

Aug. 3, 1988 [DE] Fed. Rep. of Germany ....... 3826373

[51] Int. Cl.$^5$ .................... C01B 17/16; C01B 31/20; C02F 1/68
[52] U.S. Cl. .................................. 423/231; 210/749; 210/751; 252/8.51; 502/316
[58] Field of Search ............... 210/749, 751; 252/8.51; 423/231; 502/316

[56] References Cited

U.S. PATENT DOCUMENTS 4,008,775  2/1977  Fox ........................................ 175/64

FOREIGN PATENT DOCUMENTS 2304897  8/1974  Fed. Rep. of Germany .
2170188  7/1986  United Kingdom .

OTHER PUBLICATIONS

World Oil, Band 179, No. 1, Jul. 1974, Seiten173–179, Gulf Publishing Co., Houston, Tex., US, "New mud additive will neutralize H2S".

G. R. Gray et al., "Composition and properties of oil well drilling fluids", 4, Ausgabe, 1981, Seiten 460–464, 590, Gulf Publishing Co., Houston, US.

*Primary Examiner*—Robert L. Stoll
*Assistant Examiner*—Lori F. Cuomo
*Attorney, Agent, or Firm*—Sprung, Horn, Kramer & Woods

[57] ABSTRACT

Hydrogen sulphide is removed (for example from drilling muds) using porous iron oxides which consist to the extent of at least 80% by weight of $Fe_3O_4$ and in which at least 10% of their pore volume is in the form of pores of diameters in the range from 2000 to 6000 Å.

6 Claims, No Drawings

PROCESS FOR REMOVAL OF HYDROGEN SULPHIDE USING SPECIFIC IRON OXIDES

The present invention relates to the removal of hydrogen sulphide using porous iron oxides.

Because of its toxicity, its corrosive properties and its unpleasant smell, hydrogen sulphide is often undesirable. The maximum amount permitted at workplaces is thus only 10 ppm (=MWC value). In the region of bores with which deposits of petroleum and/or natural gas are to be explored and to be obtained therefrom, hydrogen sulphide is undesirable not only because of its toxicity but also because it causes damage to the drilling equipment and in this way necessitates interruptions in the drilling operations and replacement of components of the drilling equipment. Finally, the specification for many industrial products specifies that these may contain only very small amounts of hydrogen sulphide. Examples of these are industrial gases and combustible and engine fuels. If such industrial products are produced from fossilized raw materials, it is therefore often necessary to remove the hydrogen sulphide from these.

Removal of hydrogen sulphide by reaction thereof with porous iron oxides is already known. Thus, DE-OS (German Published Specification) 2,431,226 (=US-PS 4,008,775) describes iron oxide products having the ideal composition of $Fe_3O_4$ with surface areas which are more than 10 times the surface area of magnetite, and a process for removal of hydrogen sulphide from drilling mud using such iron oxide products. US-PS 4,476,027 describes the use of such iron oxide products for removal of hydrogen sulphide from liquids containing hydrogen sulphide. The disadvantage of this process is that, in order to remove a certain amount of hydrogen sulphide, either relatively large amounts of iron oxide are needed or relatively long contact times are needed, especially in the alkaline medium which usually exists in drilling muds.

A process has now been found for removal of hydrogen sulphide using porous iron oxides, which is characterized in that the iron oxide consists to the extent of at least 80% by weight of $Fe_3O_4$ and at least 10% of its pore volume is in the form of pores having diameters in the range from 2000 to 6000 Å.

The process according to the invention is suitable for the removal of hydrogen sulphide from the most diverse media. For example, hydrogen sulphide can be removed from gases and liquids, for example hydrogen, methane, liquid hydrocarbons, water and aqueous solutions, with the aid of the process according to the invention, by passing the gases or liquids through a layer of the iron oxide to be used according to the invention, which is in this case preferably in the form of particles having diameters in the range from 0.1 to 10 mm. If appropriate, such particles can be obtained by preliminary pressing of finer material.

Hydrogen sulphide can be removed from the region of bores, in particular from the region of bores for exploring and obtaining petroleum and/or natural gas from their deposits, with particular advantage with the aid of the process according to the invention. In this case, the iron oxide to be used according to the invention is usually added to the drilling mud, for example in the form of particles having diameters in the range from 0.1 to 40 μm and in amounts of 1 to 20%, based on the volume of the total drilling mud. The composition of the drilling mud is not critical here. The process according to the invention can be used in combination with all the customary drilling muds, for example with aqueous drilling muds which have been rendered alkaline and which contain aluminum layer silicates (for example bentonite), if appropriate fluid loss agents (for example Antisol ® FL 30), if appropriate electrolytes (for example sodium chloride and/or calcium chloride) and if appropriate diluents (for example chromium lignosulphonate).

Porous iron oxides in the context of the present invention are, for example, those having a porosity of 55 to 80%. The porosity is preferably in the range from 60 to 70%.

The iron oxide to be employed according to the invention consists to the extent of at least 80% by weight of $Fe_3O_4$. It preferably consists to the extent of at least 92%, and particularly preferably to the extent of 95 to 100% by weight, of $Fe_3O_4$. In addition to $Fe_3O_4$, other iron oxides, for example $Fe_2O_3$, and/or other substances, for example silicon, aluminium, carbon, sodium, iron, chromium, manganese and/or nickel, in elemental form or in the form of compounds, can also be present if appropriate. Substances which may be mentioned in particular are: silicates, silicon dioxide, iron sulphide, aluminium oxide and carbon.

It Is an essential feature of the present invention that at least 10% of the pore volume of the iron oxide is present in the form of pores having diameters in the range from 2000 to 6000 Å. Preferably, 10 to 100% of the pore volume of the iron oxide is in the form of pores having diameters in the range from 2000 to 6000 Å, and particularly preferably 15 to 80% of the pore volume. Within the pore diameters of 2000 to 6000 Å, those from 2300 to 5000 Å are preferred, and especially those from 3000 to 4700 A. Iron oxides in which 20 to 75% of the pore volume is present in the form of pores having diameters of 2300 to 5000 A are especially preferred.

In a particular embodiment of the present invention, iron oxides in which in addition the ratio of the specific pore surface area determined by the BET add method to the specific pore surface area determined by the mercury method is 1:1 to 2:1 are employed. This ratio is preferably 1.5:1 to 1.9:1. Details on the BET and mercury method can be found in Chimia 35 (10), 408–419 (1981).

The particle size of the iron oxides can be, for example, in the range from 0.1 μm to 10 mm. For use thereof in drilling muds, more than 90% by weight of the iron oxide is preferably in the form of particle sizes of between 0.2 and 20 μm.

The particle size distribution of the iron oxides can be mono- and multimodal. It is preferably monomodal.

The process according to the invention results in a surprisingly good and rapid absorption of the hydrogen sulphide by the iron oxide. In contrast to the iron oxide usually employed for such purposes, a given amount of hydrogen sulphide can therefore be removed in a shorter time and/or with a smaller amount of iron oxide. Another advantage of the process according to the invention is a greater absence of dust in comparison with the prior art.

The present invention also relates to the use of iron oxides described above for removal of hydrogen sulphide, and to drilling muds, which are characterized in that they contain 1 to 20% by weight of the iron oxides described above, based on the volume of the total drilling mud.

EXAMPLES

The following examples were carried out in the laboratory and as far as possible simulate the reality of conditions in a bore hole for obtaining petroleum and/or natural gas from a deposit.

EXAMPLE 1

420 g of swellable sodium montmorillonite were slowly introduced in portions into 4830 ml of tap water, while stirring vigorously with a propeller-like stirrer. The swellable sodium montmorillonite had been obtained by treatment of bentonite based on calcium montmorillonite with sodium carbonate solution. The mixture was subsequently stirred for 5 hours until a suspension which was free from lumps was obtained, and the closed vessel was then left to stand at room temperature for 30 hours. It was then stirred up vigorously again and 60 g of chromium lignosulphonate were first added in portions, followed by a solution of 3.42 g of sodium hydroxide in 750 ml of water. A sample drilling mud with a pH of 9 was thus obtained.

This was transferred to a 12 l autoclave and 341.1 g of an iron oxide having the following features were then added:

Content of $Fe_3O_4$: 95% by weight
Porosity: 67%
Pore distribution: 60% of the pore volume in the form of pores having diameters in the range from 2000 to 5000 Å.
Specific pore surface area by the Hg method: 6.4 $m^2/g$
Specific pore surface area by the BET method: 10.8 $m^2/g$
Particle size distribution: 1 to 40 μm (96% between 1 and 8 μm).

Stirring was then continued with the autoclave closed. Stirring was initially carried out for 30 minutes under normal pressure, 175 ml (=138.8 g) of hydrogen sulphide were then metered in from a pump and a pressure of 30 bar was established with nitrogen. A sample was then taken immediately and in each case after 10, 30, 60 and 120 minutes and the sulphide content therein was determined by the Garett method. For sampling, in each case 150 ml of the mixture in the autoclave was forced into a second autoclave containing 180 g of 20% strength sodium hydroxide solution. After letting down, the sample was centrifuged and the clear supernatant was filtered once again over a fluted filter. The sulphide content was determined in the filtrate which emerged from the fluted filter.

The results are summarized in Table 1.

EXAMPLE 2 (for comparison)

The procedure was as in Example 1, but an iron oxide was employed according to the prior art, this having the following features:

Content of $Fe_3O_4$: 95% by weight
Porosity: 54%
Pore distribution: 8% of the pore volume in the form of pores having diameters in the range from 2000 to 5000 Å.
Specific pore surface area by the Hg method: 5.4 $m^2/g$
Specific pore surface area by the BET method: 6.8 $m^2/g$
Particle size distribution: 0.1 to 190 μm (90% between 0.1 and 80 μm).

The results are summarized in Table 1.

EXAMPLE 3

The procedure was as in Example 1, but a Wyoming bentonite was employed instead of the bentonite activated with sodium carbonate. This product was an original sodium montmorillonite. In addition, sodium hydroxide solution was added to the sample drilling mud until a pH of 11 was reached. The results are summarized in Table 1.

EXAMPLE 4 (for comparison)

The procedure was as in Example 3, but the same iron oxide as in Example 2 was employed. The results are summarized in Table 1.

TABLE 1

| Example | Content of $S^{2-}$ in ppm after | | | | | |
|---|---|---|---|---|---|---|
| | 0 | 10 | 30 | 60 | 120 | minutes |
| 1 | 11800 | 5400 | 103 | 97 | 188 | |
| 2 (for comp.) | 10300 | 7200 | 9100 | 4200 | 2500 | |
| 3 | 10500 | 2500 | 110 | 115 | 115 | |
| 4 (for comp.) | 13900 | 11200 | 10400 | 7200 | 2400 | |

It can be seen that the iron oxide with the characteristics according to the invention is superior to the products of the prior art by a factor of at least 10.

What is claimed is:

1. A process for the removal of hydrogen sulphide comprising contacting the hydrogen sulphide with porous iron oxides, in which the iron oxide comprises to the extent of at least 80% by weight of $Fe_3O_4$ and 20 to 75% of its pore volume is in the form of pores having diameters in the range from 2300 to 5000 Å.

2. The process of claim 1, in which the iron oxide has a porosity of 55 to 80%.

3. The process of claim 1, in which the iron oxide comprises to the extent of at least 92% by weight of $Fe_3O_4$.

4. The process of claim 1, in which 10 to 100% of the pore volume of the iron oxide is in the form of pores having diameters in the range from 2000 to 6000 Å.

5. The process of claim 1, in which in the iron oxide, the ratio of the specific pore surface area determined by the BET method to the specific pore surface area determined by the mercury method is 1:1 to 2:1.

6. The process of claim 1, in which the iron oxide is present in a particle size of 0.1 μm to 10 mm.

* * * * *